United States Patent
Kankipati et al.

(10) Patent No.: US 9,455,774 B2
(45) Date of Patent: *Sep. 27, 2016

(54) LOW COMPLEXITY SOFT OUTPUT MIMO DECODER

(71) Applicant: Imagination Technologies Limited, Kings Langley (GB)

(72) Inventors: Sriram Kankipati, Hyderabad (IN); Somya Sharma, Hyderabad (IN); Vellenki Umapathireddy, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/019,651

(22) Filed: Feb. 9, 2016

(65) Prior Publication Data

US 2016/0164582 A1    Jun. 9, 2016

Related U.S. Application Data (63) Continuation of application No. 14/461,628, filed on Aug. 18, 2014, now Pat. No. 9,294,173.

(30) Foreign Application Priority Data

Aug. 29, 2013    (GB) .................................. 1315410.9

(51) Int. Cl.
  *H04B 7/04*    (2006.01)
  *H04L 25/03*   (2006.01)
  *H04L 25/02*   (2006.01)
  *H04B 7/08*    (2006.01)

(52) U.S. Cl.
  CPC ............ *H04B 7/0456* (2013.01); *H04B 7/046* (2013.01); *H04B 7/0882* (2013.01); *H04L 25/0204* (2013.01); *H04L 25/0246* (2013.01); *H04L 25/03318* (2013.01)

(58) Field of Classification Search
  USPC ................ 375/260, 262, 267, 299, 347, 349
  See application file for complete search history.

(56) References Cited

U.S. PATENT DOCUMENTS 8,711,989 B1 *    4/2014   Lee ................... H04L 25/03305
                                                    375/340
2006/0259535 A1   11/2006  Cioffi et al.
(Continued)

FOREIGN PATENT DOCUMENTS

CN        102946267 A    2/2013

OTHER PUBLICATIONS

Mueller-Weinfurtner, Coding Approaches for Multiple Antenna Transmission in Fast Fading and OFDM, IEEE Transactions on Signal Processing, vol. 50, No. 10, Oct. 2002 pp. 2442-2450.

*Primary Examiner* — Kabir A Timory
(74) *Attorney, Agent, or Firm* — Vorys, Sater, Seymour and Pease LLP; Vincent M DeLuca (57) ABSTRACT

A method and processing block for receiving data transmitted in a MIMO system is provided. Data is transmitted as a transmit vector of values from multiple transmitting antennas and received as a receive vector of values at multiple receiving antennas. Candidate vectors are determined based on each of a plurality of constellation points of the constellation configuration used in the transmission scheme. A channel matrix is decomposed into a unitary matrix and a triangular matrix, such that a relationship links: (i) a function of the unitary matrix and the receive vector, and (ii) a multiplication of the triangular matrix and the transmit vector. A best candidate vector from the set of candidate vectors is utilized for the computation of soft bits representing the values of the transmit vector.

18 Claims, 4 Drawing Sheets

(56) References Cited

U.S. PATENT DOCUMENTS

| | | | |
|---|---|---|---|
| 2010/0027702 A1* | 2/2010 | Vijayan | H04L 25/0204 375/267 |
| 2010/0054365 A1 | 3/2010 | Cheng et al. | |
| 2010/0158150 A1 | 6/2010 | Prasad et al. | |
| 2011/0268231 A1 | 11/2011 | Siew | |
| 2015/0003262 A1* | 1/2015 | Eder | H04B 7/0452 370/252 |

* cited by examiner

LOW COMPLEXITY SOFT OUTPUT MIMO DECODER

BACKGROUND

Multiple Input Multiple Output (MIMO) systems are being increasingly used in communication systems. A MIMO system includes multiple transmitting antennas and multiple receiving antennas which facilitates increased data rate as compared to single input single output systems.

Figure 1:
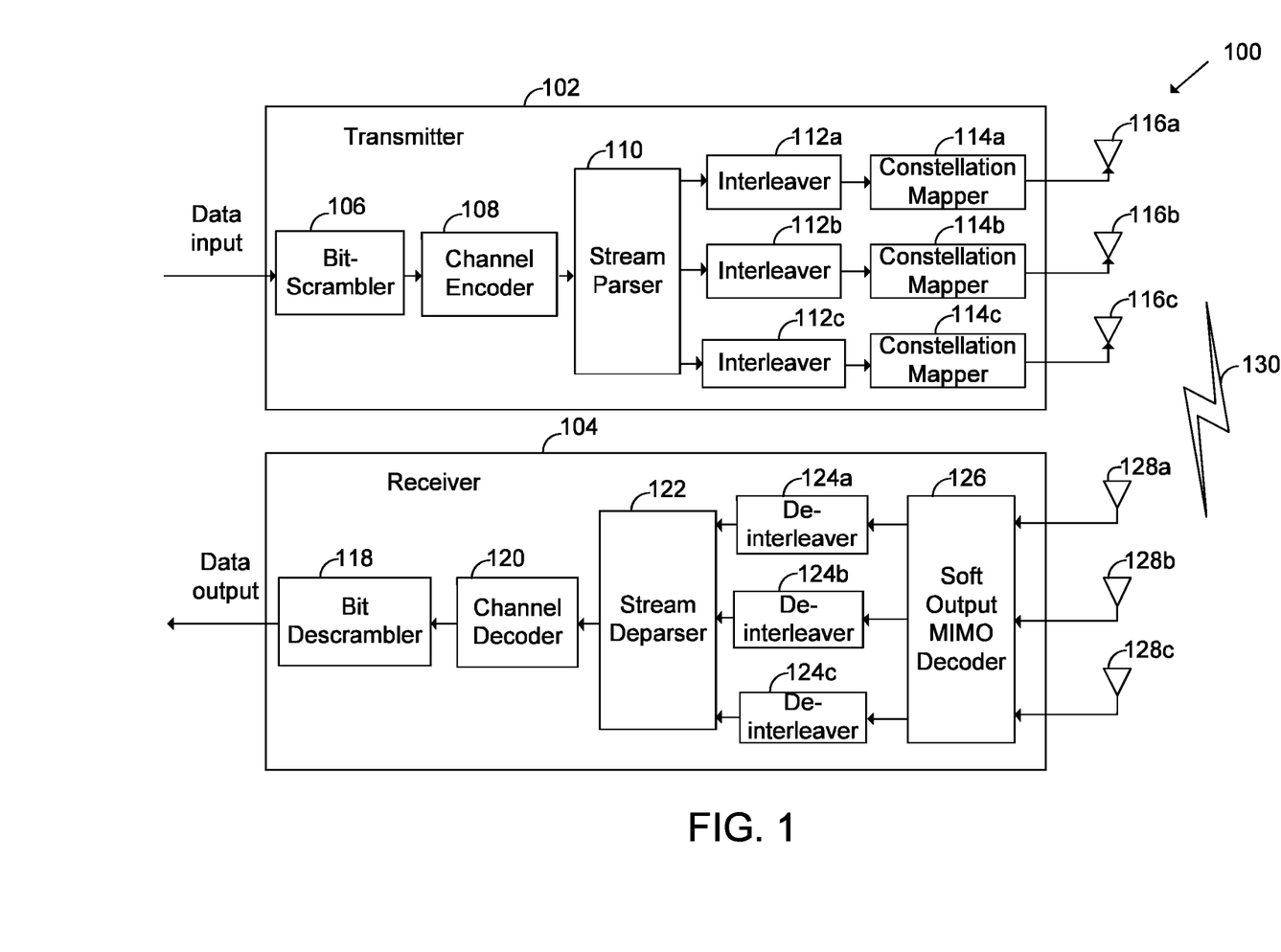
FIG. 1 is a block diagram illustrating a MIMO system in which the presently disclosed embodiments can be implemented, in accordance with at least one embodiment.

FIG. 1 is a block diagram illustrating a MIMO system 100. The MIMO system 100 comprises a transmitter 102 and a receiver 104. The transmitter 102 includes modules including a bit scrambler 106, a channel encoder 108, a stream parser 110, and may include a plurality of interleavers 112a, 112b and 112c (which herein after will be referred to as 112), a plurality of constellation mappers 114a, 114b, and 114c (which herein after will be referred to as 114) and a plurality of transmitting antennas 116a, 116b, 116c (which herein after will be referred to as 116). A plurality of first RF units (not shown) may also be present between the plurality of constellation mappers 114 and the respective transmitting antennas 116. Each of the plurality of first RF units may include, for example, a Digital to Analog Convertor (DAC), an Analog Front End (AFE) and/or other functional units as is known in the art.

The receiver 104 includes modules including a bit descrambler 118, a channel decoder 120, a stream de-parser 122, and may include a plurality of de-interleavers 124a, 124b and 124c (which herein after will be referred to as 124), a soft output MIMO decoder 126 and a plurality of receiving antennas 128a, 128b, and 128c (which herein after will be referred to as 128).

The modules of the transmitter 102 and the modules of the receiver 104 shown in FIG. 1 may be implemented in hardware, software or a combination thereof.

In operation at the transmitter 102, an input bit stream is scrambled at the bit scrambler 106 and passed through the channel encoder 108. The channel encoder 108 may be, for example, a convolution coder or any other error correcting coder.

The coded input bit stream is passed from the channel encoder 108 to the stream parser 110 which distributes the coded input bit stream into a plurality of streams. The distribution of bits may be done, for example, in a round robin fashion. Each stream of the plurality of streams is passed through a respective one of the interleavers 112. Each stream after passing through one of the interleavers 112 is inputted to the respective constellation mapper 114. Each of the constellation mappers 114 maps the respective bit stream into symbols (which are referred to herein as "values"). A transmit vector representing the set of symbols (or "values") for each of the plurality of transmitting antennas 116 is converted in to an analog signal by a Digital to Analog converter and fed to the RF unit (not shown) and transmitted over a MIMO channel 130 by the plurality of transmitting antennas 116.

The receiver 104 receives the transmitted analog signal (corresponding to the transmit vector multiplied by a channel matrix H which represents the effect of the MIMO channel 130 on the transmit vector as it is transmitted over the MIMO channel 130) through the plurality of receiving antennas 128. A plurality of second RF units (not shown) may be connected to the plurality of receiving antennas 128. In order to convert the received analog signal into a digital signal each of the plurality of second RF units may be followed by an Analog to Digital Convertor (ADC).

In an example of the MIMO system 100, if the transmit vector, consisting of symbols from all the transmit antennas, is represented by "t", the channel matrix is represented by "H", and the system noise is represented by the vector v, then a received vector "y" received at the receiver 104 is represented as:

$$y = Ht + v \qquad (1)$$

Each element $h_{i,j}$ of the channel matrix, H, may denote a channel gain between the $i^{th}$ transmitting antenna 116 and the $j^{th}$ receiving antenna 128. The soft output MIMO decoder 126 decodes the set of symbols (outputted by the plurality of second RF units) into soft bits. The soft bits are de-interleaved by the respective de-interleavers 124 (124a, 124b, and 124c). The output of the de-interleavers 124 may be deparsed into a single bitstream by the stream de-parser 122. The output of the stream de-parser 122 is decoded at the channel decoder 120 and may be de-scrambled by the bit de-scrambler 118, and is provided as an output of the receiver 104.

For decoding the multiple coded streams of symbols at the receiver 104 into soft bits, highly complex algorithms may be utilized, such as a Maximum Likelihood (ML) algorithm. The complexity of the decoding algorithm and the amount of hardware used (owing to multiple antennas) increases the cost of implementing a MIMO system. Existing techniques, such as the ML technique, offer solutions for decoding the set of symbols that have a high performance (e.g. a low bit-error rate (BER)), but require a large number of computations. Other techniques, such as a Zero Forcing (ZF) technique, have lower complexity, but have poor performance (e.g. a high BER) compared to the ML technique.

SUMMARY

According to embodiments illustrated herein, there is provided a method of receiving data transmitted in a MIMO system. The data is transmitted from a transmitter over a MIMO channel as a transmit vector comprising a plurality of values. The method comprises receiving the data as a receive vector comprising a plurality of values, wherein the data is received over the MIMO channel at a receiver. The method includes decomposing a MIMO channel matrix which represents the MIMO channel into a combination of a unitary matrix and a triangular matrix. There is a relationship linking: (i) a function of the unitary matrix and the receive vector, and (ii) a multiplication of the triangular matrix and the transmit vector. The method includes determining a set of candidate vectors for representing the transmit vector by, for each of a plurality of constellation points, setting a particular value of a corresponding candidate vector to that constellation point and using the relationship to map the other values of the candidate vector to ones of the constellation points, thereby determining the set of candidate vectors in which the particular value within the respective candidate vectors is set to be the respective ones of the constellation points. Thereafter soft bits representing the plurality of values of the transmit vector are determined at the receiver using the set of candidate vectors.

According to embodiments illustrated herein, there is provided a processing block configured to process data at a receiver in a MIMO system. The data is transmitted from a transmitter over a MIMO channel as a transmit vector comprising a plurality of values and received at the receiver as a receive vector comprising a plurality of values. The processing block further comprises a matrix decomposing module configured for decomposing a MIMO channel matrix which represents the MIMO channel into a combination of a unitary matrix and a triangular matrix. There is a relationship linking: (i) a function of the unitary matrix and the receive vector, and (ii) a multiplication of the triangular matrix and the transmit vector. The processing block further includes a candidate vector determination module for determining a set of candidate vectors by, for each of a plurality of constellation points, setting a particular value of a corresponding candidate vector to that constellation point and using the relationship to map the other values of the candidate vector to ones of the constellation points, to thereby determine the set of candidate vectors in which the particular value within the respective candidate vectors is set to be the respective ones of the constellation points. A soft bits determination module is configured to use the set of candidate vectors to determine soft bits representing the plurality of values of the transmit vector.

According to embodiments illustrated herein, there is provided a computer program product configured to compute soft bits representing data transmitted in a MIMO system, according to any of the methods described herein.

BRIEF DESCRIPTION OF DRAWINGS

The accompanying drawings illustrate various embodiments of systems, methods, and embodiments of various other aspects of the invention. Any person having ordinary skills in the art will appreciate that the illustrated element boundaries (e.g., boxes, groups of boxes, or other shapes) in the Figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements might not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

The present disclosure is best understood with reference to the detailed Figures and description set forth herein. Various embodiments are discussed below with reference to the Figures. However, those skilled in the art will readily appreciate that the detailed descriptions given herein with respect to the Figures are simply for explanatory purposes as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

The present disclosure describes a soft output MIMO decoder. The soft output MIMO decoder includes a matrix decomposing module, a candidate vector determination module and a soft bits determination module. The matrix decomposing module receives a channel matrix and decomposes the channel matrix into a unitary matrix and a triangular matrix. There is a relationship which links: (i) a function of the unitary matrix and a received vector (e.g. a multiplication of the complex conjugate transpose of the unitary matrix and the received vector), to (ii) a multiplication of the triangular matrix and a transmit vector. Using the relationship, a plurality of candidate vectors are computed. The best candidate vector of the plurality of candidate vectors is utilized for the determination of soft bits.

The decomposition of the channel matrix into the unitary matrix and the triangular matrix is useful because it allows for a relatively simple determination of the candidate vectors by setting particular values within the candidate vectors to be different ones of a plurality of possible values (referred to herein as constellation points). Due to the triangular nature of the triangular matrix, by setting one of the values of a candidate vector, the other values of that candidate vector can be determined in turn by projecting the values to the nearest constellation points, as described in more detail below.

It may be determined which of the candidate vectors is the best candidate to be used to represent the transmit vector. By limiting the determination of the best match to the candidate vectors, this determination may be less complex (e.g. involve fewer computations) than in a ML technique in which every combination of possible constellation points is considered to determine a best match for the transmit vector. This is described in more detail below.

Figure 2:
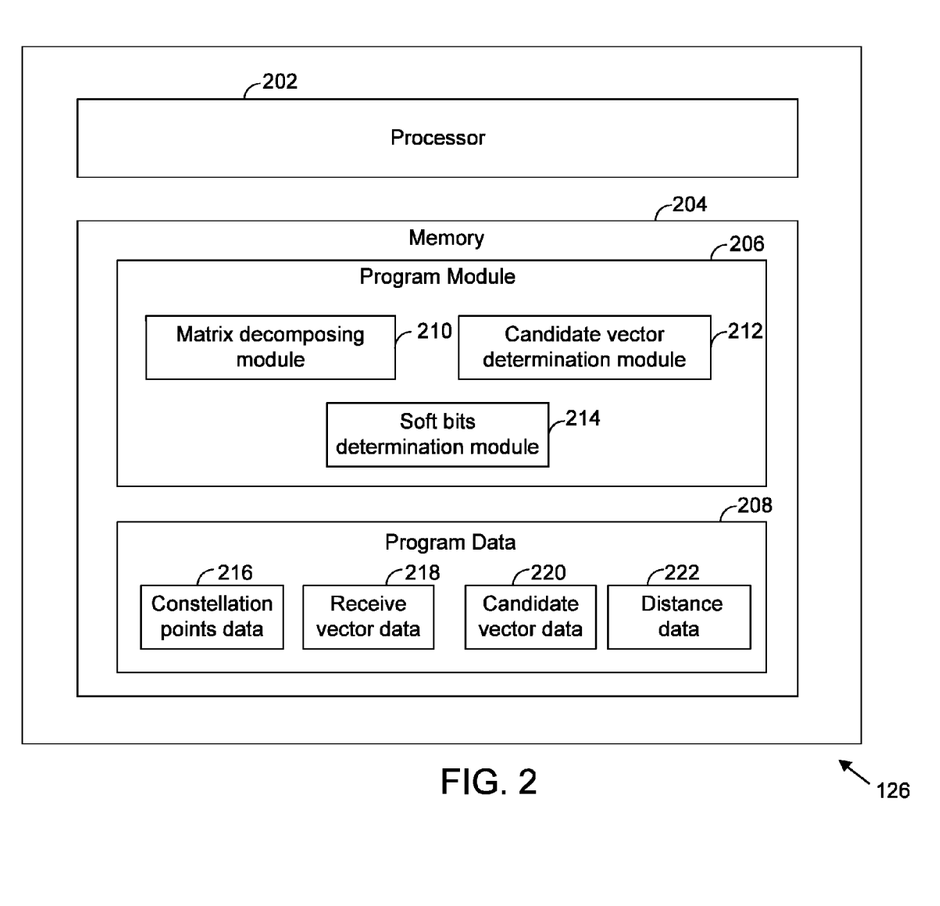
FIG. 2 is a block diagram illustrating a soft output MIMO decoder, in accordance with at least one embodiment.

FIG. 2 is a block diagram illustrating the soft output MIMO decoder 126 in accordance with at least one embodiment.

In this example, the soft output MIMO decoder 126 may be implemented as a processing block and may include a processor 202 and a memory 204. The memory 204 includes a program module 206 and program data 208. The processor 202 is capable of executing a set of instructions which are stored in the program module 206 and accessing a set of data from the program data 208 for the execution of the set of instructions.

The processor 202 may refer to a general purpose CPU (Central Processing Unit) or a more specialized processing unit such as a DSP (Digital Signal Processor) or GPU (Graphics Processing Unit), or any other processors with similar capabilities. The processor 202 is configured to execute the set of instructions stored in the memory 204.

The memory 204 is connected to the processor 202. The memory 204 may be an internal memory like Static Random Access Memory (SRAM), Dynamic Random Access Memory (DRAM), Read Only Memory (ROM), Flash memory or any other suitable type of internal memory.

Alternatively the memory 204 may be an external memory connected to the soft output MIMO decoder 126. Examples of such external memory 204, are Universal Serial Bus (USB) drives, hard disks, floppy disks, Compact Disks (CDs) or any known similar external storage devices. The memory 204 may also be any suitable combination of the above.

In an example, the program module 206 includes a matrix decomposing module 210, a candidate vector determination module 212, and a soft bits determination module 214. The modules within the program module 206 may be implemented in hardware, software or any combination thereof.

The matrix decomposing module 210 is configured to decompose the channel matrix (H) into a unitary matrix (Q) and a triangular matrix (R) as described in more detail below. The decomposing of the channel matrix may be done by, for example, a Gram-Schmidt process, Householder transformations, or Givens rotations combined with CORDIC algorithm.

The candidate vector determination module 212 is connected to the matrix decomposing module 210 and the soft bits determination module 214. The candidate vector determination module 212 may be configured to determine a set of candidate vectors for each of a plurality of permutations of the channel matrix, H. The set of candidate vectors may be utilized for determining an estimate of the transmit vector, t, as described below. The candidate vectors are vectors which may represent the transmit vector. Each of the candidate vectors is tested to determine which of the candidate vectors provides the best representation of the transmit vector based on the received vector and knowledge of the MIMO channel 130 (e.g. the channel matrix, H).

The soft bits determination module 214 is configured to determine the soft bits representing the plurality of values of the transmit vector. The soft bits determination module 214 takes the best matching candidate vector to the transmit vector and other vectors from candidate vector determination module 212 and determines log-likelihood metrics for each bit of the transmit vector.

The program data 208 includes constellation points data 216, receive vector data 218, candidate vector data 220 and distance data 222.

The constellation points data 216 may be configured to store a plurality of constellation points.

The receive vector data 218 may be configured to store a receive vector received at the receiver 104.

The candidate vector data 220 may be configured to store the set of candidate vectors determined by the candidate vector determination module 212.

The distance data 222 may be configured to store a distance calculated for each of the determined candidate vectors, as described in more detail below.

Figure 3:
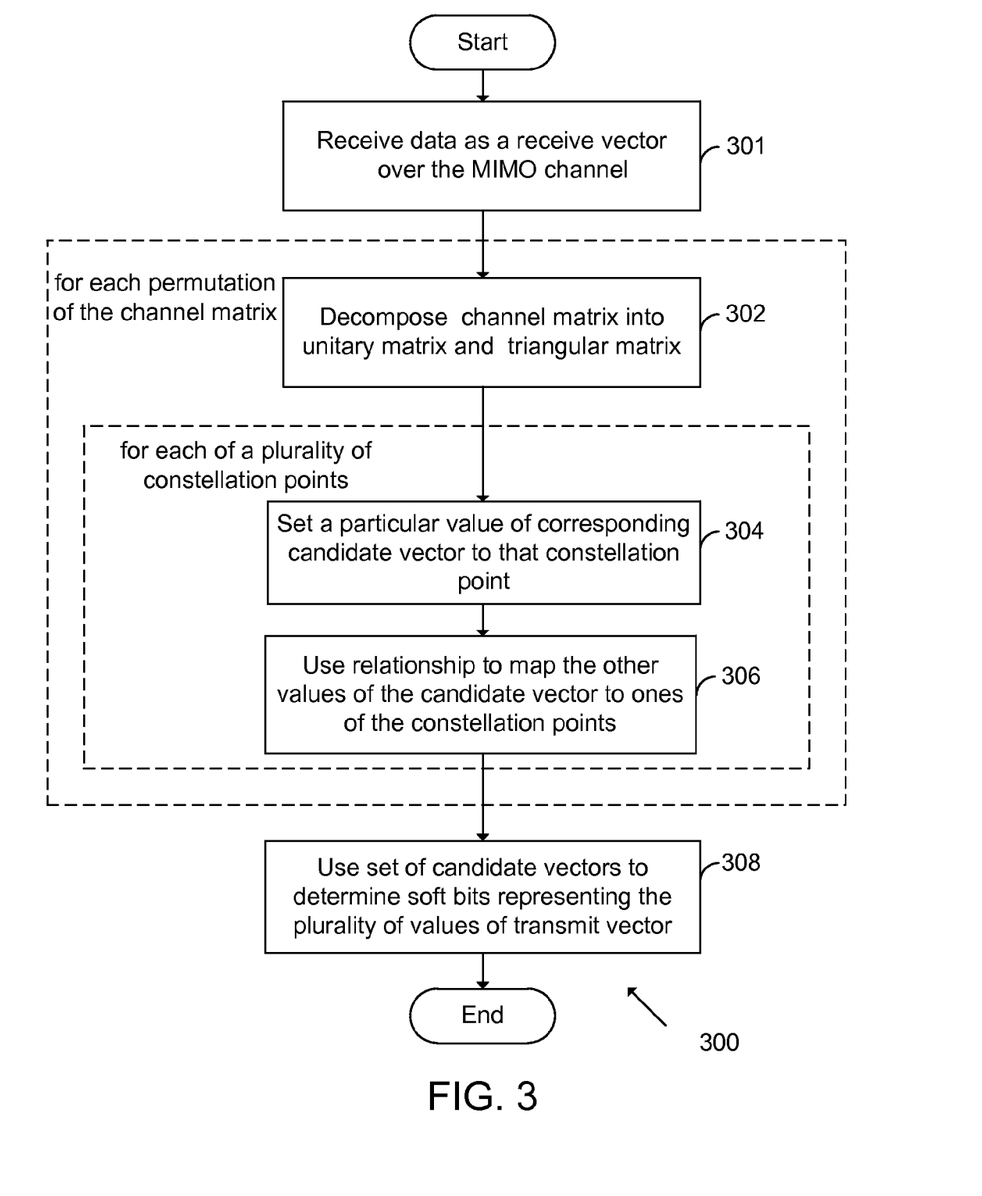
FIG. 3 is a flow diagram illustrating a method of computing soft bits for a MIMO system, in accordance with at least one embodiment.

FIG. 3 is a flow diagram 300 illustrating a method of computing soft bits in the MIMO system 100, in accordance with at least one embodiment.

The method begins at step 301. At step 301, the receiver 104 receives data over the MIMO channel 130 at the receiving antennas 128. The data is received as a receive vector by the multiple receiving antennas 128. The data is transmitted from M transmitting antennas 116 of the transmitter 102 over the MIMO channel 130 (which is represented by the channel matrix, H) and received at N receiving antennas 128 at the receiver 104. The received data is passed to the soft output MIMO decoder 126.

At step 302, the matrix decomposing module 210 decomposes the channel matrix (H) into the unitary matrix (Q) and the triangular matrix (R). The triangular matrix (R) may be an upper triangular matrix or a lower triangular matrix, but in the examples described in detail below it is an upper triangular matrix. In examples described in detail herein, the unitary matrix Q is an N×N unitary matrix and the triangular matrix R is an N×M upper triangular matrix whose elements are independent of each other.

By decomposing H into Q and R, equation (1) is written as:

$$y = QRt + v \quad (2)$$

It would be apparent to a person skilled in the art that the unitary matrix (Q) when multiplied with a conjugate transpose of the unitary matrix (Q*) results in an identity matrix.

Thus by multiplying both sides of equation (2) by Q*, equation (2) is further reduced to:

$$\tilde{y} = Rt + \tilde{v} \quad (3)$$

Where $\tilde{y}$ is a function of the unitary matrix (Q) and the receive vector (y). In particular, $\tilde{y}$ is the receive vector (y) multiplied by the conjugate transpose (Q*) of the unitary matrix (Q); and $\tilde{v}$ is the noise vector (v) multiplied by the conjugate transpose (Q*) of the unitary matrix (Q). The vector, $\tilde{v}$, has the same distribution as the original noise vector, v, which is modeled as a circularly symmetric complex Gaussian vector with mutually uncorrelated elements of zero mean and variance $\sigma_v^2$.

When N>M, the components of the last N-M rows of the upper triangular matrix, R, will all be zeros and the corresponding rows of $\tilde{y}$ contain only noise. By dropping these rows on both sides we can expand equation (3) as:

$$\begin{bmatrix} \tilde{y}_1 \\ \vdots \\ \tilde{y}_M \end{bmatrix} = \begin{bmatrix} r_{1,1} & r_{1,2} & \cdots & r_{1,M} \\ 0 & r_{2,2} & \cdots & r_{2,M} \\ \vdots & \ddots & \ddots & \vdots \\ 0 & 0 & \cdots & r_{M,M} \end{bmatrix} \begin{bmatrix} t_1 \\ \vdots \\ t_M \end{bmatrix} + \begin{bmatrix} \tilde{v}_1 \\ \vdots \\ \tilde{v}_M \end{bmatrix} \quad (9)$$

According to the methods described herein, candidate vectors are determined to represent the transmit vector t. In order to determine a candidate vector, the $M^{th}$ value of the candidate vector, $s_M$ (which corresponds to the Mth value, $t_M$, of the transmit vector t), is set to be equal to a possible value that may have been transmitted from the $M^{th}$ transmitting antenna 116. The possible values are defined by the constellation points of the transmission scheme (e.g. 4-QAM, 16-QAM or 64-QAM) being used in the MIMO system 100.

With $s_M$ set to one of the constellation points, the $(M-1)^{th}$ value of the candidate vector, $s_{M-1}$, can be determined as a projection of $$\frac{\tilde{y}_{M-1} - r_{M-1,M} s_M}{r_{M-1,M-1}}$$

onto the closest constellation point. Due to the triangular nature of R, a similar process can be performed to determine each of the values of the candidate vector in turn working back from the $M^{th}$ value to the first value. For example, the $(M-2)^{th}$ value of the candidate vector, $s_{M-2}$, can be determined as a projection of $$\frac{\tilde{y}_{M-2} - r_{M-2,M-1} s_{M-1} - r_{M-2,M} s_M}{r_{M-2,M-2}}$$

onto the nearest constellation point. In this way the values of a candidate vector are determined.

The steps can be repeated to determine another candidate vector by setting the $M^{th}$ value $s_M$ to a different one of the possible constellation points and then determining the other values of the candidate vector on that basis. In this way a set of candidate vectors (denoted $S_M$) is determined for representing the transmit vector. It can be appreciated that this determination is facilitated by the triangular nature of the matrix R, such that each value of the candidate vector can be determined on the basis of setting $M^{th}$ of the candidate vector to a particular constellation point and then determining how this affects the other values of the candidate vectors. Therefore, if there are $C_M$ possible constellation points for the $M^{th}$ value of the transmit vector in the transmission scheme, then $C_M$ candidate vectors will be determined by setting the $M^{th}$ value of the candidate vectors to each of the possible constellation points. Each candidate vector has M values.

The set of candidate vectors described above, $S_M$, are determined by setting the Mth value of the candidate vectors to particular ones of the constellation points and working back from there to determine the other values of the candidate vectors. Other candidate vectors can be determined by setting other values of the candidate vectors to particular ones of the constellation points and working back from there to determine the other values of the candidate vectors. In order to make use of the triangular nature of the matrix R, as described above, the columns of the channel matrix, H, are permuted, e.g. such that the last column corresponds to the $(M-1)^{th}$ value, and then the steps described above are repeated to obtain a set of candidate vectors denoted $S_{M-1}$. The $(M-1)^{th}$ values of the candidate vectors in the set of candidate vectors $S_{M-1}$ are set to respective ones of the constellation points from a set of $C_{M-1}$ possible constellation points, and then the other values of the candidate vectors are determined on that basis. Therefore, there will be $C_{M-1}$ candidate vectors in the set $S_{M-1}$ which are determined by setting the $(M-1)^{th}$ value of the candidate vectors to each of the possible constellation points. Each candidate vector has M values. The number of possible constellation points for the $M^{th}$ values of the candidate vectors, may be the same as the number of possible constellation points for the $(M-1)^{th}$ values of the candidate vectors, i.e. $C_M$ may be equal to $C_{M-1}$. However, in more general examples this is not necessarily the case, and $C_M$ may be different to $C_{M-1}$.

This is repeated for each of the M permutations of the channel matrix, H, in order to determine M sets of candidate vectors $S_M$ to $S_1$, each set having $C_i$ (where i=1, 2 . . . M) candidate vectors, each candidate vector having M values. The candidate vectors are de-permuted such that the elements of the candidate vectors are in the same order as transmitted vector.

The method is described below with reference to the flow chart shown in FIG. 3 in the case of a simple example, of a 3×3 MIMO system (i.e. where M=N=3). It will be apparent that the flow chart shown in FIG. 3 can also apply to the more general examples described above. The general equation (4) then becomes:

$$\begin{bmatrix} \tilde{y}_1 \\ \tilde{y}_2 \\ \tilde{y}_3 \end{bmatrix} = \begin{bmatrix} r_{1,1} & r_{1,2} & r_{1,3} \\ 0 & r_{2,2} & r_{2,3} \\ 0 & 0 & r_{3,3} \end{bmatrix} \begin{bmatrix} t_1 \\ t_2 \\ t_3 \end{bmatrix} + \begin{bmatrix} \tilde{v}_1 \\ \tilde{v}_2 \\ \tilde{v}_3 \end{bmatrix} \quad (5)$$

In this example, at step 304, the candidate vector determination module 212 selects a value from the plurality of constellation points. A particular value of a candidate vector (e.g. the $M^{th}$ value of the candidate vector $$\begin{bmatrix} s_1 \\ \vdots \\ s_M \end{bmatrix},$$

i.e. in this example the value $s_3$ which corresponds to $t_3$) is set to be equal to the selected constellation point. The plurality of constellation points may be fetched from the constellation points data 216. The particular value may be stored at the candidate vector data 220.

Considering an example where the constellation configuration utilized by the constellation mapper 114 (114a, 114b, and 114c) is 4-QAM. In such a case the constellation points data 216 may contain values of (1, −1, j, −j), where j=√T. The value of an element of a candidate vector, for instance $s_3$ may be set as one of the constellation points, e.g. −1, at step 304. In other examples, another constellation configuration may be used, such as 16-QAM in which there are sixteen constellation points or 64-QAM in which there are sixty four constellation points. As described above, the number of constellation points in the constellation configuration is denoted herein as "$C_i$" for the ith permutation of the channel matrix.

At step 306, the candidate vector determination module 212 uses the relationship between $\tilde{y}$ and Rt (e.g. defined by equation (5) above in this example) to map the other values of the candidate vector to constellation points from the constellation configuration being used.

In an example, the relationship given by equation (5) may be utilized for estimating the other values of candidate vector.

Equation (5) can be used to determine the values of a candidate vector s which represents the transmit vector t. The value of $s_3$ is set to be one of the constellation points. The value of $s_2$ is determined according to equation $$\frac{\tilde{y}_2 - r_{2,3} s_3}{r_{2,2}},$$

which is then projected to the nearest constellation point. It is noted that all of the terms in this equation are known at the receiver 104. Then when $s_2$ is determined, it can be used to determine $s_1$ according to the equation $$\frac{\tilde{y}_1 - r_{1,2} s_2 - r_{1,3} s_3}{r_{1,1}},$$

which is then projected to the nearest constellation point.

Therefore, when a first value ($s_3$) of a first candidate vector is set as −1 at step 304, then a second value ($s_2$) and a third value $s_1$ are determined using the previously determined values. Since the matrix R is triangular all of the values of a candidate vector can be determined by setting one of the values (e.g. $s_3$) and then following this back through the other values. This is repeated for each of the constellation points to get a set of four candidate vectors (denoted $S_3$) by setting $s_3$ to the four different constellation points (1, −1, j and −j). Hence the number of candidate vectors determined depends on the number of constellation points.

As described above, the method steps 302 to 306 may be performed for each of a plurality of permutations of the channel matrix, H, to determine a set of candidate vectors for each of the permuted versions of the channel matrix. The permutation step may be applied, for example, to the columns of the channel matrix, e.g. so that the last column of the permuted matrix corresponds to the $(M-1)^{th}$ column of the unpermuted matrix. In this way sets of candidate vectors $S_2$ and $S_1$ can be determined, such that in total there are three sets of candidate vectors, each set comprising four candidate vectors in this simple example of a 3×3 MIMO system with a 4-QAM constellation configuration, such that there are a total of twelve candidate vectors in this simple example.

At step 308, the soft bits determination module 214 may use the sets of candidate vectors to determine soft bits that may represent the plurality of values ($t_1$, $t_2$ and $t_3$) in the transmit vector, t. The method of determining soft bits is further explained in detail below with respect to FIG. 4.

Figure 4:
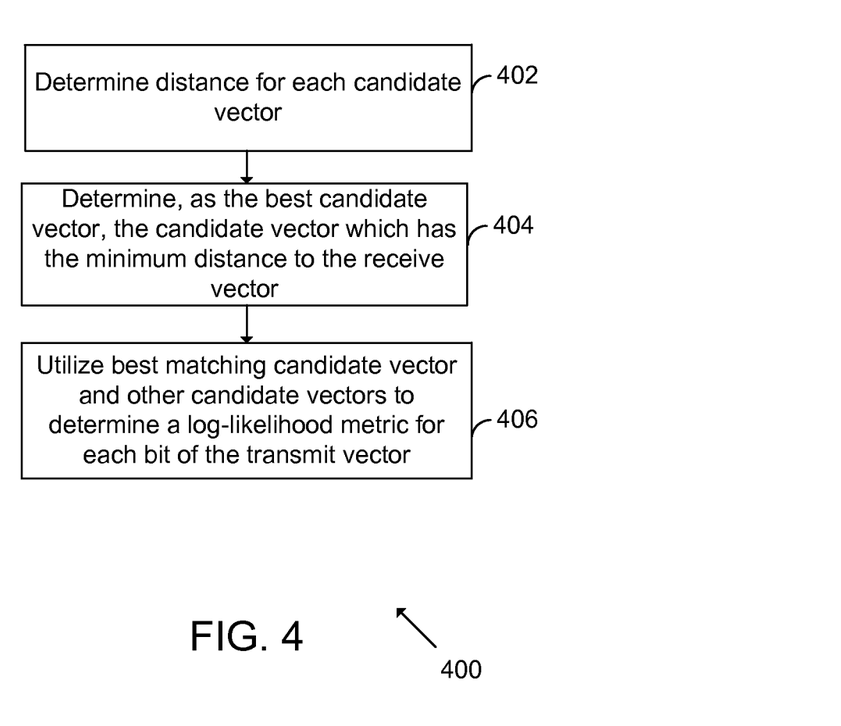
FIG. 4 is a flow diagram illustrating a method of determining soft bits for a MIMO system, in accordance with at least one embodiment.

FIG. 4 is a flow diagram 400 illustrating a method of determining soft bits in the MIMO system 100, in accordance with at least one embodiment.

At step 402, the soft bits determination module 214 determines a distance for each of the candidate vectors determined in the preceding steps. The distance for each candidate vector is determined based on the difference between the receive vector (y) and an estimate of the receive vector computed using the candidate vector (i.e. Hs). The distance for each of the candidate vectors may be determined by using, but is not limited to using, a Norm 1 technique, a Norm 2 technique or other similar techniques.

At step 404, a best matching candidate vector from the determined candidate vectors is determined. In the examples described herein, the best candidate vector is the candidate vector which has the minimum distance.

That is, the best candidate vector, $s_{best}$, is determined according to the equation:

$$s_{best} = \min_{s \in S_i, i=1,2,\ldots,M} \|y - Hs\|^2 \quad (6)$$

This gives a good approximation to the results achieved using a ML technique, but the complexity of implementing the methods described herein is much less than that of implementing a ML technique. In the ML case, a transmit vector, $t_{ml}$ is determined by finding the minimum distance between the receive vector (y) and the predicted receive vector (Ht) predicted using every possible transmit vector, i.e. transmit vectors having every combination of different constellation points. That is, in the ML case, the best matching transmit vector $t_{ml}$ is determined according to the equation:

$$t_{ml} = \min_{t \in c_1 \times C_2 \times \ldots \times C_M} \|y - Ht\|^2 \quad (7)$$

The ML case involves testing a huge number ($\Pi_{i=1}^{M} C_i$) of possible transmit vectors to find the best matching transmit vector $t_{ml}$. In contrast, the methods described herein which determine $s_{best}$ according to equation (6) involve testing $\Pi_{i=1}^{M} C_i$ candidate vectors to find the best matching candidate vector $s_{best}$. The candidate vectors are likely to include good matches for the transmit vector since they include all of the different variations of vectors determined based on setting one of the values of the candidate vector to one of the possible constellation points. However, it is possible that the candidate vectors do not include the best match for the transmit vector, t, so the performance of the methods described herein may be lower than the performance of the ML technique in terms of quality, e.g. BER. However, as discussed below, the slight reduction in performance may be outweighed by the large reduction in complexity, as compared to the ML technique.

At step 406, the soft bits determination module 214 utilizes the best matching candidate vector, $s_{best}$, and other candidate vectors (i.e. other values from the candidate vector determination module 212), to determine a log-likelihood metric for each bit of the transmit vector. Each log-likelihood metric may indicate the likelihood that a transmitted bit is a one or a zero. That is, log-likelihood metrics are determined for each bit of the transmit vector, based on bits of the candidate vectors including bits of the best matching candidate vector.

To introduce the method of computing the soft bits, we first consider the computation of near-optimum (ML) bit metrics. The total number of bits, B, in the transmitted vector is given by $B = \Sigma_{i=1}^{M} \log_2 C_i$, where $C_i$ is the size of the constellation configuration (e.g. for 4-QAM, $C_i=4$ and for 16-QAM, $C_i=16$, etc). Therefore, the binary bits of the transmit vector, defined as label b, are given by $[b^0, b^{B-1}]$. For the lth binary bit ($b^l$), the log-likelihood metric is given by:

$$L(b^l | y, H) = \ln \frac{Pr\{b^l = 1 | y, H\}}{Pr\{b^l = 0 | y, H\}}$$

$$L(b^l | y, H) \approx \ln \frac{\max_{\bar{t} \in T(b^l=1)} pr(y | \bar{t}, H)}{\max_{\bar{t} \in T(b^l=0)} pr(y | \bar{t}, H)}$$

$$L(b^l | y, H) \approx \frac{1}{\sigma_v^2} \left( \min_{\bar{t} \in T(b^l=0)} |y - H\bar{t}|^2 - \min_{\bar{t} \in T(b^l=1)} |y - H\bar{t}|^2 \right)$$

In these equations, Pr(.) and pr(.) represent probability of (.) and probability density function of (.) respectively, $T(b^l=m)$ denotes the subset of transmit vectors for which the lth bit of label b is m and $\bar{t}$ represents the transmit vector with lth bit equal to 1 (or 0) accordingly. Note that the computation of the ML metric, given above, grows exponentially with the number of constellations, and with the number of antennas M, as the number of possible transmit vectors, $\bar{t}$, is given by $C_1 \times C_2 \times \ldots C_M$.

However, rather than using the ML technique, the methods described herein determine the candidate vectors, s. If we let $b_i^k$ denote the kth bit of ith layer of the transmit vector t, (where the ith "layer" of a vector refers to a symbol at the ith position in the vector, such that in this case the ith layer of the transmit vector is the symbol transmitted by the ith transmitting antenna 116) then using a similar approach as used above in the ML case, we can determine log-likelihood values as:

$$L(b_i^k | y, H) = \min_{\bar{s} \in S_i^{k,0}} \|y - H\bar{s}\|^2 - \min_{\bar{s} \in S_i^{k,1}} \|y - H\bar{s}\|^2$$

where $S_i^{k,\alpha}$ is the subset of candidate vectors from the all of the sets ($S = S_1 + S_2 \ldots + S_M$) that have the kth bit of the ith layer equal to a (i.e. $S_i^{k,\alpha}$ is the subset of all of the candidate vectors which have the kth bit of the ith symbol equal to a), and $\bar{s}$ is a vector in subset $S_i^{k,0}$ (or $S_i^{k,1}$) accordingly.

Using the best match for the candidate vectors, $s_{best}$, a value μ can be defined as $\mu = \|y - Hs_{best}\|^2$, $\overline{b_l^k}$ is kth bit of ith layer of best candidate vector, we can write the log-likelihood values, L, as:

$$L(b_i^k \mid y, H) = \begin{cases} \mu - \min_{s \in S_i^{k,1}} \|y - H\bar{s}\|^2, & \text{if } \overline{b_i^k} = 0 \\ \min_{s \in S_i^{k,0}} \|y - H\bar{s}\|^2 - \mu, & \text{if } \overline{b_i^k} = 1 \end{cases}$$

Simulations have been performed showing the BER performance with soft bits derived from the ML technique and derived using the methods described herein related to the candidate vectors. The performance loss with the methods described herein is less than 0.75 dB at BER of $10^{-4}$.

However, the computational complexity for the ML technique is much higher than that of the methods described herein. As described above the ML estimate of the transmit vector is determined as shown in equation (7), which involves testing $\Pi_{i=1}^{M} C_i$ possible vectors. For each possible vector, t, the value of Ht is determined and then $\|y-Ht\|^2$ is determined which involves $M^2$ multiplications and the computation of M squared Euclidean distances. Therefore, assuming $C=C_i$ for all values of i, the total complexity for the ML technique can be represented as $M^2 C^M$ multiplications and $MC^M$ squared Euclidean distances.

In contrast, with the methods described herein using the candidate vectors, for each permutation of H, C (M-tuple) (assuming $C=C_i$, for all values of i) vectors are computed which involves $C(M^2+M-2)/2$ multiplications. Since M sets of candidate vectors are derived corresponding to M permutations of H, the total number of multiplications for deriving the candidate vectors is $MC(M^2+M-2)/2$. In this approximation the multiplications involved in computing $\tilde{y}$ have been ignored. For each of the CM candidate vectors, s, the value of Hs is computed (which involves $M^2$ multiplications) and then $\|y-Hs\|^2$ is computed (which involves M squared Euclidean distances, i.e. one for each of the M values of the vectors). Hence, the solution of equation (6) involves $M^2(CM)$ multiplications and $M(CM)$ squared Euclidean distances. Thus, the total complexity for evaluating $s_{best}$ is $C(3M^3+M^2-2M)/2$ multiplications and $CM^2$ squared Euclidean distances.

Table 4 shows the number of multiplications and squared Euclidean distances (denoted "Squared EDs" in Table 4) that are computed for the ML case and the methods described herein using the candidate vectors (denoted in Table 4 as the "candidate vector" case), in a 4×4 MIMO system (i.e. M=N=4) with two constellation configurations: 16-QAM and 64-QAM.

It is apparent from Table 4 that the complexity (e.g. number of multiplications and Euclidean distances that are performed) is much lower for the methods described herein using the candidate vectors than for the ML case.

TABLE 4

|  | 16-QAM | | 64-QAM | |
| --- | --- | --- | --- | --- |
|  | Multiplications | Squared EDs | Multiplications | Squared EDs |
| ML | 1,048,576 | 262,144 | 268,435,456 | 67,108,864 |
| Candidate Vector | 1600 | 256 | 6400 | 1024 |

In a variant of the transmission scheme, in one of the options recommended for IEEE 802.11n, the number of streams mapped into symbols (denoted "p") is less than M, the number of transmitting antennas 116, and they are linearly combined into M transmit layers. An M×p matrix denoted as Z is formed whose elements are chosen to give the specified combinations. The matrix Z is formed such that t=Zq where q is the vector of p symbols. The received signal vector is then given by:

$$y = HZq + v \qquad (8)$$

Since Z is known, H and Z can be combined into a known matrix A=HZ and then the method can proceed in the same way as described above but replacing H with A in order to determine the soft bits of the transmit vector. It can therefore be seen that the methods described herein in which candidate vectors are determined can be adapted to the other variants of transmission schemes.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, "Windows", 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method and system, as described above, have numerous advantages. Some of these advantages may include, but are not limited to, reducing number of computations used to determine the best candidate vector there by resulting in reducing the complexity of the determining the soft bits.

Various embodiments of the Low complexity soft output MIMO decoder have been disclosed. However, it should be apparent to those skilled in the art that many more modifications, besides those described, are possible without departing from the inventive concepts herein. In interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method of receiving data transmitted in a MIMO system, wherein the data is transmitted from a transmitter over a MIMO channel as a transmit vector comprising a plurality of values, the method comprising:

receiving the data as a receive vector comprising a plurality of values, the data being received over the MIMO channel at a receiver in which the MIMO channel is represented as a MIMO channel matrix decomposed into a combination of a unitary matrix and a triangular matrix, wherein there is a relationship linking: (i) a function of the unitary matrix and the receive vector, and (ii) a multiplication of the triangular matrix and the transmit vector;

determining a set of candidate vectors for representing the transmit vector by: for each of a plurality of constellation points, setting a particular value of a corresponding candidate vector to that constellation point and using the relationship and the particular value which is set to map other values of the candidate vector to constellation points, thereby determining the set of candidate vectors in which the particular value within the candidate vectors is set to be respective ones of the constellation points;

determining further sets of candidate vectors by: permuting columns of the MIMO channel matrix which represents the MIMO channel, decomposing the MIMO channel matrix into a further unitary matrix and a further triangular matrix, and repeating said determining a set of candidate vectors, this time based on the permuted MIMO channel matrix; and using the sets of candidate vectors determined from the MIMO channel matrix and the permuted WINO channel matrix at the receiver to determine soft bits representing the plurality of values of said transmit vector.

2. The method of claim 1 wherein said using the sets of candidate vectors to determine the soft bits comprises determining a best matching candidate vector to the transmit vector by finding the candidate vector which when used to estimate the receive vector using the MIMO channel matrix provides a closest estimate to the receive vector.

3. The method of claim 2 wherein said determining a best matching candidate vector comprises determining a distance of the estimated receive vector from the received receive vector for each of the candidate vectors, wherein the best matching candidate vector is the candidate vector for which a minimum distance is determined.

4. The method of claim 3 wherein the best matching candidate vector, $s_{best}$, is determined according to the equation:

$$s_{best} = \min_s \|y - Hs\|^2$$

where s are the candidate vectors, y is the receive vector and H is the MIMO channel matrix.

5. The method of claim 4 wherein said using the sets of candidate vectors to determine the soft bits comprises determining log-likelihood metrics for each bit of the transmit vector, based on bits of the candidate vectors including bits of the best matching candidate vector.

6. The method of claim 5 wherein the log-likelihood metric, $L(b_i^k|y,H)$, for a kth bit, $b_i^k$, of an ith layer of the transmit vector t is determined according to the equation:

$$L(b_i^k | y, H) = \begin{cases} \mu - \min_{s \in S_i^{k,1}} \|y - Hs\|^2, & \text{if } \overline{b_i^k} = 0 \\ \min_{s \in S_i^{k,0}} \|y - Hs\|^2 - \mu, & \text{if } \overline{b_i^k} = 1 \end{cases}$$

where y is the receive vector, H is the MIMO channel matrix, $\mu$ is defined as $\mu = \|y - Hs_{best}\|^2$, s are the candidate vectors, $s_{best}$ is the best matching candidate vector, $S_i^{k,0}$ is a subset of the candidate vectors that have a kth bit of an ith layer equal to 0, $S_i^{k,1}$ is a subset of the candidate vectors that have the kth bit of the ith layer equal to 1 and $\overline{b_i^k}$ is the kth bit of the ith layer of the best matching candidate vector.

7. The method of claim 1 wherein the transmit vector is transmitted from M transmitting antennas, M being an integer greater than or equal to 1, and there are either M values in the transmit vector or p values in the transmit vector wherein p<M.

8. The method of claim 7 wherein there are p values in the transmit vector and wherein the method comprises determining an M×p matrix denoted Z which when multiplied by a vector of the p values gives the transmitted values of the transmit vector.

9. The method of claim 1 wherein the transmit values of the transmit vector have been mapped to constellation points.

10. The method of claim 1 wherein the data has been coded to form the transmit vector using a bit scrambler, a Channel encoder and an interleaver, and wherein the soft bits representing the data transmitted in the MIMO system are decoded using a de-interleaver, a Channel decoder and a bit de-scrambler.

11. The method of claim 1 wherein said function of the unitary matrix and the receive vector is a multiplication of a complex conjugate transpose of the unitary matrix and the receive vector.

12. A computer program product configured to compute soft bits representing data transmitted in a MIMO system, the computer program product being embodied on a non-transitory computer-readable storage medium and comprising processor-executable instructions that cause a processor to perform the method of claim 1.

13. A processing block, including at least one processor, said processing block configured to process data at a receiver in a MIMO system, wherein the data is transmitted from a transmitter over a MIMO channel as a transmit vector comprising a plurality of values and received at the receiver as a receive vector comprising a plurality of values, the processing block comprising:
  a matrix decomposing unit configured to decompose a MIMO channel matrix which represents the MIMO channel into a combination of a unitary matrix and a triangular matrix, wherein there is a relationship linking: (i) a function of the unitary matrix and the receive vector, and (ii) a multiplication of the triangular matrix and the transmit vector;
  a candidate vector determination unit configured to:
    determine a set of candidate vectors for representing the transmit vector by: for each of a plurality of constellation points, setting a particular value of a corresponding candidate vector to that constellation point and using the relationship and the particular value which is set to map other values of the candidate vector to constellation points, to thereby determine the set of candidate vectors in which the particular value within the candidate vectors is set to be respective ones of the constellation points;
    determine further sets of candidate vectors using a permuted version of the MIMO channel matrix in which columns of the MIMO channel matrix have been permuted; and
  a soft bits determination unit configured to use all of the determined sets of candidate vectors determined from the MIMO channel matrix and the permuted MIMO channel matrix to determine soft bits representing the plurality of values of said transmit vector.

14. The processing block of claim 13, wherein said soft bits determination unit is configured to determine a best matching candidate vector to the transmit vector by finding the candidate vector which when used to estimate the receive vector using the MIMO channel matrix provides a closest estimate to the receive vector.

15. The processing block of claim 14 wherein said soft bits determination unit is configured to determine the best matching candidate vector, $s_{best}$, according to the equation:

$$s_{best} = \min_s \|y - Hs\|^2$$

where s are the candidate vectors, y is the receive vector and H is the MIMO channel matrix.

16. The processing block of claim 14 wherein said soft bits determination unit is configured to determine log-likelihood metrics for each bit in the transmit vector, based on bits of the candidate vectors including bits of the best matching candidate vector.

17. The processing block of claim 16 wherein said soft bits determination unit is configured to determine the log-likelihood metric, $L(b_i^k|y,H)$, for a kth bit, $b_i^k$, of an ith layer of the transmit vector t according to the equation:

$$L(b_i^k | y, H) = \begin{cases} \mu - \min_{s \in S_i^{k,1}} \|y - Hs\|^2, & \text{if } \overline{b_i^k} = 0 \\ \min_{s \in S_i^{k,0}} \|y - Hs\|^2 - \mu, & \text{if } \overline{b_i^k} = 1 \end{cases}$$

where s are the candidate vectors, y is the receive vector, H is the MIMO channel matrix, $\mu$ is defined as $\mu = \|y - Hs_{best}\|^2$, $s_{best}$ is the best matching candidate vector, $S_i^{k,0}$ is a subset of the candidate vectors that have a kth bit of an ith layer equal to 0, and $S_i^{k,1}$ is a subset of the candidate vectors that have the kth bit of the ith layer equal to 1 and $b_i^k$ is kth bit of ith layer of best matching candidate vector.

18. The processing block of claim 13 further comprising a de-interleaver, a channel decoder and a bit de-scrambler configured to process the soft bits determined by the soft bits determination unit.

* * * * *